June 26, 1962 M. C. SANZ 3,040,931
BURETTE
Filed April 18, 1961 2 Sheets-Sheet 1
FIG_1_
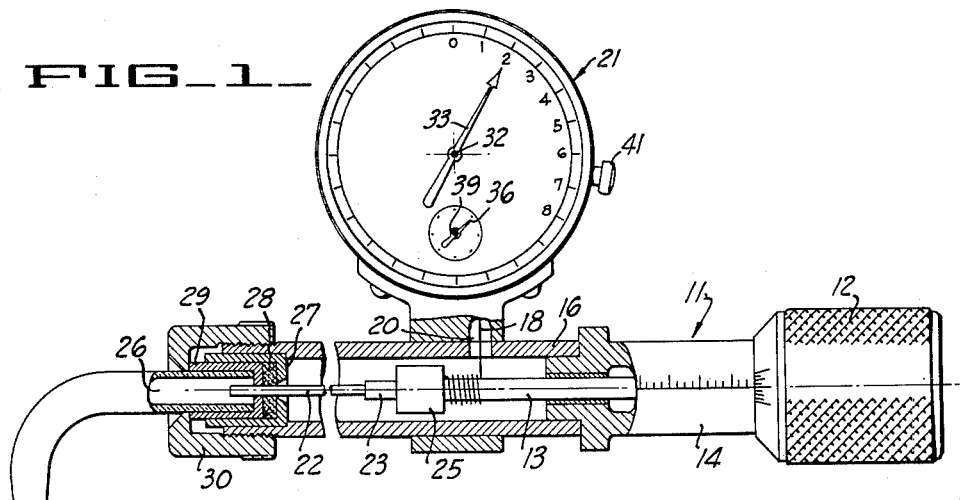
FIG_2_
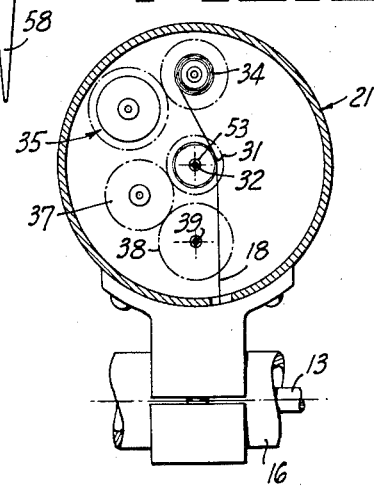
FIG_4_
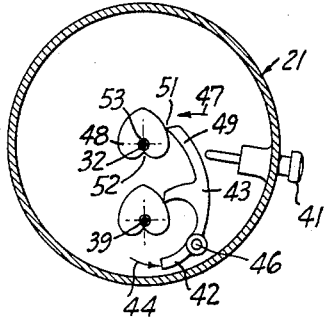
FIG_3_
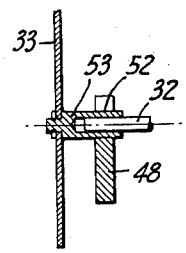
FIG_5_
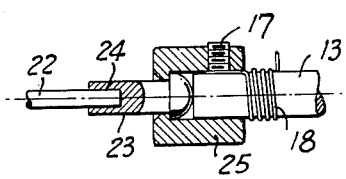
INVENTOR.
Manuel C. Sanz
BY
ATTORNEYS June 26, 1962 M. C. SANZ 3,040,931
BURETTE
Filed April 18, 1961 2 Sheets-Sheet 2
FIG. 6
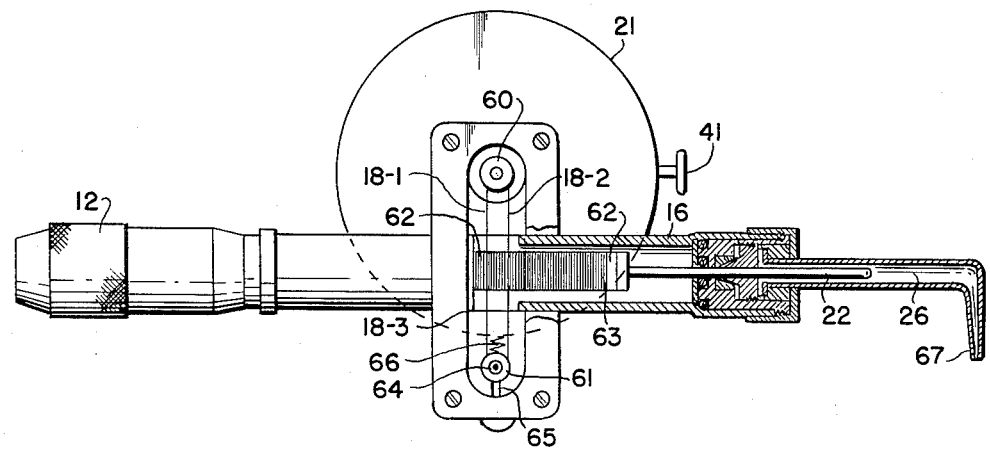
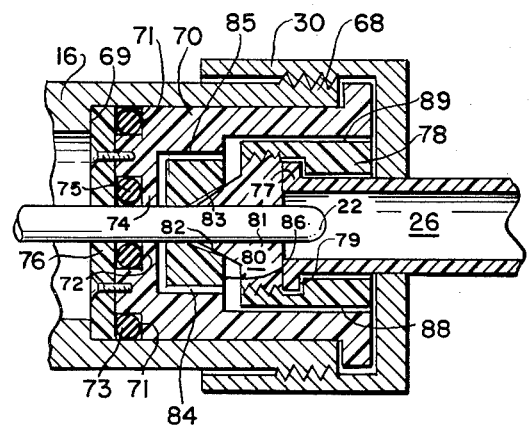
FIG. 7
INVENTOR.
Manuel C. Sanz
BY Greene, Pineles & Durr

3,040,931
BURETTE
Manuel Claude Sanz, 46 Ave. Tournay, Chambesy, Geneva, Switzerland
Filed Apr. 18, 1961, Ser. No. 103,896
4 Claims. (Cl. 222—26)

The present invention relates generally to a burette and more particularly to a microliter burette capable of supplying an indication of predetermined and variable small quantities of delivered liquid.

This application is a continuation-in-part of U.S. application Serial No. 689,806 filed October 14, 1957.

Among the objects of the invention is to provide a burette capable of delivering predetermined small quantities of liquid and indicating exactly the quantities delivered.

Among other objects of the invention is to provide a burette capable of delivering small quantities of liquid and indicating the quantity, and in which the indicator may be reset to zero at the termination of delivery of each sample thereby simplifying the successive readings.

It is a further object of the invention to provide a burette with a mechanical means to precisely meter liquid from a chamber and record the amount of liquid metered in which the burette includes means to prevent leakage of the liquid from the chamber back into the recording means.

These and other objects of the invention will become more clearly apparent from the following description when taken in conjunction with the accompanying drawing.

Referring to the drawing:

FIGURE 1 is a side elevational view, partly in section, of a burette constructed in accordance with the invention;

FIGURE 2 is a schematic view indicating a particular arrangement of the indicator mechanism;

FIGURE 3 shows the frictional attachment of the pointer to the drive shaft;

FIGURE 4 shows a suitable reset mechanism; and

FIGURE 5 is an enlarged view, in section, showing the attachment of the sample rod to the drive.

FIGURE 6 is a rear view, partly broken away (and with a plate removed), of a modified form of the invention.

FIGURE 7 is a greatly enlarged detail view of the sealed portion of FIG. 6.

In general, the burette employs a micrometer movement including a micrometer nut and screw to advance a rod into a reservoir containing a liquid sample. The rod displaces the liquid sample as it is advanced into the reservoir. The micrometer screw advances the rod a predetermined distance into the reservoir for each revolution to displace an exact amount of liquid. Suitable indicator means are associated with the apparatus for accurately indicating the rotative movement of the micrometer screw and give an indication of the advance of the rod into the sample reservoir. In FIGS. 1–5, such means includes a wire or other suitable filamentary material which winds onto the rotating rod and which has its free end spring loaded. The wire is wound around an element which drives a pointer to indicate the linear displacement of the wire.

Referring more particularly to FIGURE 1, a micrometer movement 11 having a knob 12 which rotates the screw (not shown) to advance the rod 13 is shown. The knob 12 rotates about the barrel 14 which is adapted to hold the nut of the micrometer movement. The end portion of the barrel 14 is adapted to receive the tube 16. The rod 13 extends coaxially within the tube 16. Suitable means are provided for receiving and holding the end portion of the wire 18. For example, the end may be held by the screw 17. The wire is then wound onto the rod and extends upwardly through the opening 20 formed in the tube into the indicator 21, to be presently described in detail.

Referring particularly to FIGURE 5, a glass synthetic material, or the like inert rod 22 is suitably attached to a metallic pin 23 as, for example, by accommodating the end within the hole 24 formed in the member 23. The member 23 is held by a cup-shaped element 25 which is suitably secured to the adjacent end of the micrometer rod 13, as for example, by means of set screws 17. Thus, while the micrometer rod 13 is rotated, the rod 22 and member 23 are moved axially but are not adapted to rotate therewith.

The forward end of the rod 22 extends into the liquid sample reservoir 26 through a suitable packing means. For example, the packing means may include a cup-shaped member 27 which may be formed of hard inert material, for example, "Teflon" or "Kel-F," and which rides tightly over the rod 22. A packing ring 28 of softer material like silicon rubber is placed within the member 27. When compressed, the material 28 forms a packing which prevents leakage of sample liquid from the reservoir into the tube 16. The liquid reservoir 26 which may be formed of glass has a cup-shaped "Teflon" sleeve 29 suitably secured thereto as, for example, with epoxy cement. The reservoir is mounted on the apparatus by sliding the sleeve 29 over the rod 22 until it abuts against the packing 28. A suitable cap 30 is then secured as, for example, by threads to the adjacent portion of the tube 16. When the cap is tightened, the packing 28 bears tightly against the rod 22 to form the seal, previously described.

The amount of axial movement of the micrometer rod 13 and, consequently, the rod 22 may be obtained by a reading of the micrometer dials. However, repeated readings are relatively inaccurate and difficult to make when small rotative movement is required. Consequently, a novel indicating means is associated with the rod 13 to give an expanded reading which is considerably easier to read than one which might be obtained by reading of the micrometer dials. The wire 18 which winds onto the rod 13 passes upwardly into the indicator 21 and makes a one or two-turn loop over the pulley 31 which is carried on the shaft 32 which drives a pointer 33 (FIGURE 1). The wire 18 then extends upwardly and is reeled onto a suitable pulley 34. The pulley 34 is geared to a spring means 35 which may, for example, be a spring of the type used for the main spring of a watch or the like. The spring means 35 serves to maintain a relatively constant tension on the wire 18 whereby the same frictionally engages the pulley 31 and winds spirally and tightly onto the rod 13. As the rod rotates, the wire 18 is spirally wound thereon and is moved downwardly thereby rotating the pulley 31 and shaft 32 which, in turn, moves the pointer 33 of the indicating means. By suitably choosing the ratio or diameter of the rod 13 and pulley 31, an expanded reading may be obtained. For example, if the two have the same diameter, then one turn of the rod 13 will give a complete revolution of the pointer 33. This is a relatively large expansion of the rotative movement of the rod and easily read in comparison with a reading from the micrometer dials.

It may be desirable to obtain a count of revolutions when large quantities of liquids are dispensed. Consequently, a suitable gear is carried by the shaft 32 to drive a revolution counter indicator 36. Referring to FIGURE 2, for example, the gearing may include an idler gear 37 and a gear 38 which has its shaft 39 suitably secured to the dial 36 to thereby drive the same. Any ratio or turns between these dials may be obtained by suitably choosing the ratio of diameters of the various gears forming the gear drive or by adding more gears.

The wire or filamentary material 18 may be made of steel, or synthetic material, for example, nylon, or silk or the like. Preferably, the filamentary member 18 should be of such material that it does not stretch with moisture or temperature changes. It must be strong enough to withstand the tension applied to the same. The various packing means and reservoir 26 which are in contact with the liquid to be measured should be made of material that is not attacked by the liquid.

It is apparent that it is desirable to be able to reset the dial to zero at the completion of delivering each sample thereby eliminating the necessity of subtracting one reading from another. Such means might comprise a reset mechanism. The reset mechanism might include a push button 41 which extends outwardly from the side of the dial indicator and which controls a reset mechanism. The button 41 might, for example, urge the end 42 of the reset lever 43 in the direction indicated by the arrow 44. The reset lever 43 is suitably pivoted at 46 and thus the other end of the lever moves in a direction indicated by the arrow 47. A heart-shaped cam 48 is carried by the pointer 33. When the end 49 of the lever 43 engages the heart-shaped cam, the cam is rotated until the corner portion 51 of the reset lever engages the notch 52 of the cam. Movement of the indicating needle is then stopped. The various parts may be so arranged that when this is done the indicating needle 33 is set to zero.

In order to permit the resetting without stripping any of the gears or moving any of the internal parts of the indicator, the pointer 33 is frictionally carried on the shaft 32 as, for example, by a friction fit of the type indicated in FIGURE 3. Thus, the pointer 33 is carried on a cylindrical member 53 which is adapted to slide over the shaft 32 and be frictionally driven thereby. The heart-shaped cam 48 is carried by the cylindrical member and the pointer 33 may be moved with respect to the shaft 32 without turning any of the gearing. The friction should be so selected that there is positive movement of the indicator when there is movement of the wire 18. A similar arrangement is employed for resetting the dial 36. Such an arrangement is illustrated but not described since it is identical with that described above.

In operation then, the knob 12 is unscrewed until the rod 22 is in its retracted position. The reservoir is initially filled by removing it from the apparatus, filling it, and screwing it onto the end of the barrel. The liquid is then dispensed by rotating the knob 12 to urge the rod 22 further into the reservoir 26 thereby displacing the liquid sample. To refill the reservoir after the initial filling, the end 58 of the reservoir is dipped in liquid and the knob 12 rotated in an opposite direction thereby sucking the liquid into the reservoir.

In order to eliminate backlash it is necessary to spring load the wire 18 of FIGS. 1–5. Instead of being spring loaded by the spring device 34 (see FIG. 2) the arrangement of FIG. 6 has been found very satisfactory. According to this modification, both ends of the wire or wire-like element 18 are secured to the rod or cylinder 62 as in a notch 63. The wire 18 is passed around the cylinder 62 a number of times but an intermediate portion 18—1 of the wire 18 passes from the cylinder 62 over the pulley 60 which controls the shaft of the indicator 21 thence portion 18—2 passes directly from pulley 60 to pulley 61 and portion 18—3 passes from pulley 61 back to the cylinder 62. Pulley 61 is rotatably mounted on a shaft 64 which is slidably mounted in a slotted opening 65 and spring pressed by spring 66 to spring load the portions 18—1, 18—2 and 18—3 of the wire. Thus, each turn of the handle 12 of the burette winds a portion of the wire 18—3 from pulley 64 at the same time that an identical length of wire 18—1 is unwound (or vice versa). The spring pressed pulley 61 holds the wire sections 18—1, 18—2 and 18—3 tight against pulley 60.

In a device of this type, it may happen that the delivery nozzle 67 of the burette may become clogged in which case forcing of the rod 22 into chamber 26 builds up great pressure within chamber 26 and tends to force liquid from said chamber back into the tube 16 which contains the measuring mechanism and causing corrosion of the latter. The sealing means at the right of FIG. 6 and shown greatly enlarged in FIG. 7 has been devised to prevent leakage of liquid from chamber 26 back into tube 16.

The tube 16 is threaded at the end 68 to retain the cap 30, and includes an internal shoulder 69 adjacent the end 68. Closely fitting the internal diameter of end 68 and resting on shoulder 69 is the sleeve 70. Sleeve 70 may be made of "Teflon," "Kel-F," polyethylene, polypropylene or similar inert plastic material. The inner end of sleeve 70 contains two annular recesses 71 and 72. Annular recess 71 is on the outside and is adapted to receive the O-ring 73 to seal the sleeve 70 against the end portion 68 of tube 16. Recess 72 surrounds the interior opening 74 of sleeve 70 and is adapted to receive the O-ring 75 to seal the inner end of rod 22 from chamber 26. O-rings 73 and 75 are held in place by the washer 76 which may be of metal. Washer 76 rests against the shoulder 69 of tube 16.

The inner end of chamber tube 26 is provided with an annular flange 77 adapted to be held within the fitting 80 and its retaining ring 78 between the shoulder 79 of the ring 78 and the upper flat surface of the conical fitting 80. Ring insert 79 and conical fitting 80 may both be made of inert plastic material such as nylon, polypropylene, "Teflon" or "Kel-F." When formed of flexible plastic material, the fitting 80 and its ring 78 may be made of one piece and the end 77 of reservoir 26 may be forced into the fitting. Once the one piece fitting and ring is assembled it cannot be distorted to permit accidental removal of the reservoir. Conical fitting 80 contains a central opening 81 to fit closely about plunger rod 22 and has a conical outer surface 82. The inclination of the conical outer surface 82 of the fitting 80 is different than the inclination of the chamfered opening 83 of the sleeve 70 so that a line contact is made between the parts 70 and 80. At least two by-passing channels 84, 85 are provided in sleeve 70 connecting the internal opening 74 of said sleeve 70 with the upper internal shoulder 86. Said ring 78 contains one or more longitudinal flat or channeled portions 88, 89. Thus, any liquid which is forced back between the rod 22 and fitting 80 finds its way into channels 84, 85, channels 88 and 89 and out through the opening in cap 30, and is thus prevented from being forced into the tube 16 because it follows the less resistant path provided by said channels 84, 85, 88 and 89, instead of the more resistant path closed by the O-ring seal 75. It will be understood that the liquid from chamber 26 is forced back to channel 84 and 88 only when pressure builds up in tube 26 through some accident such as the occurrence of an obstruction in the nozzle 67 of tube 26.

The features and principles underlying the invention described above in connection with specific exemplifications will suggest to those skilled in the art many other modifications thereof. It is accordingly desired that the appended claims shall not be limited to any specific feature or details thereof.

I claim:
1. A burette dispenser comprising:
  a reservoir with a small discharge opening adapted to be filled with the liquid to be dispensed;
  a movably mounted rod having means projected axially into the reservoir to displace liquid and force the same through said discharge opening;
  and a micrometer assembly including a micrometer screw for moving said rod a predetermined axial distance for each revolution of the micrometer screw;
  a wire-like element having a first end attached to and being at least partially wound on said rod in the form of a helix with adjacent convolutions on successive longitudinal portions of said rod;
pulley means engaging an intermediate portion of said wire-like element for indicating the linear movement thereof;
spring tensioning means including a winding device:
the other end of said wire-like element being secured to said winding device whereby tension is maintained on said wire-like element.

2. A burette dispenser comprising:
a reservoir with a small discharge opening adapted to be filled with the liquid to be dispensed;
a movably mounted rod having means projecting axially into the reservoir to displace liquid and force the same through said discharge opening;
and a micrometer assembly including a micrometer screw for moving said rod a predetermined axial distance for each revolution of the micrometer screw;
a wire-like element having a first end attached to and being at least partially wound on said rod in the form of a helix with adjacent convolutions on successive longitudinal portions of said rod;
measurement indicator means including a rotatable control pulley engaging an intermediate portion of said wire-like element for indicating the linear movement thereof;
winding means for the second end of said wire-like element;
and spring take-up means for continuous applying tension to the wire-like element to maintain the same in positive actuating contact with the pulley of the measurement indicating device.

3. A burette dispenser as claimed in claim 2 wherein:
the first end of the wire-like element is attached to a first portion of said rod adjacent to said means which projects axially into said reservoir;
said winding means for the second end of said wire-like element comprising a second portion of said rod adjacent to the first portion thereof.

4. A burette dispenser as claimed in claim 2 wherein the first end of the wire-like element is attached to a first portion of said rod adjacent to said means which projects axially into said reservoir;
said winding means for the second end of said wire-like element comprising a second portion of said rod adjacent to the first portion thereof;
said spring take-up means comprising a pulley with a movable axle;
said pulley being positioned on the opposite side of said rod with respect to the control pulley of indicator means;
said axle being confined to movement toward and away from said rod;
and spring means to urge said axle away from said rod and said first pulley.

No references cited.